Sept. 27, 1960      A. G. BALE, JR      2,954,202
AUTOMATIC CONTROL MEANS FOR MATERIAL DELIVERY APPARATUS
Filed April 15, 1958
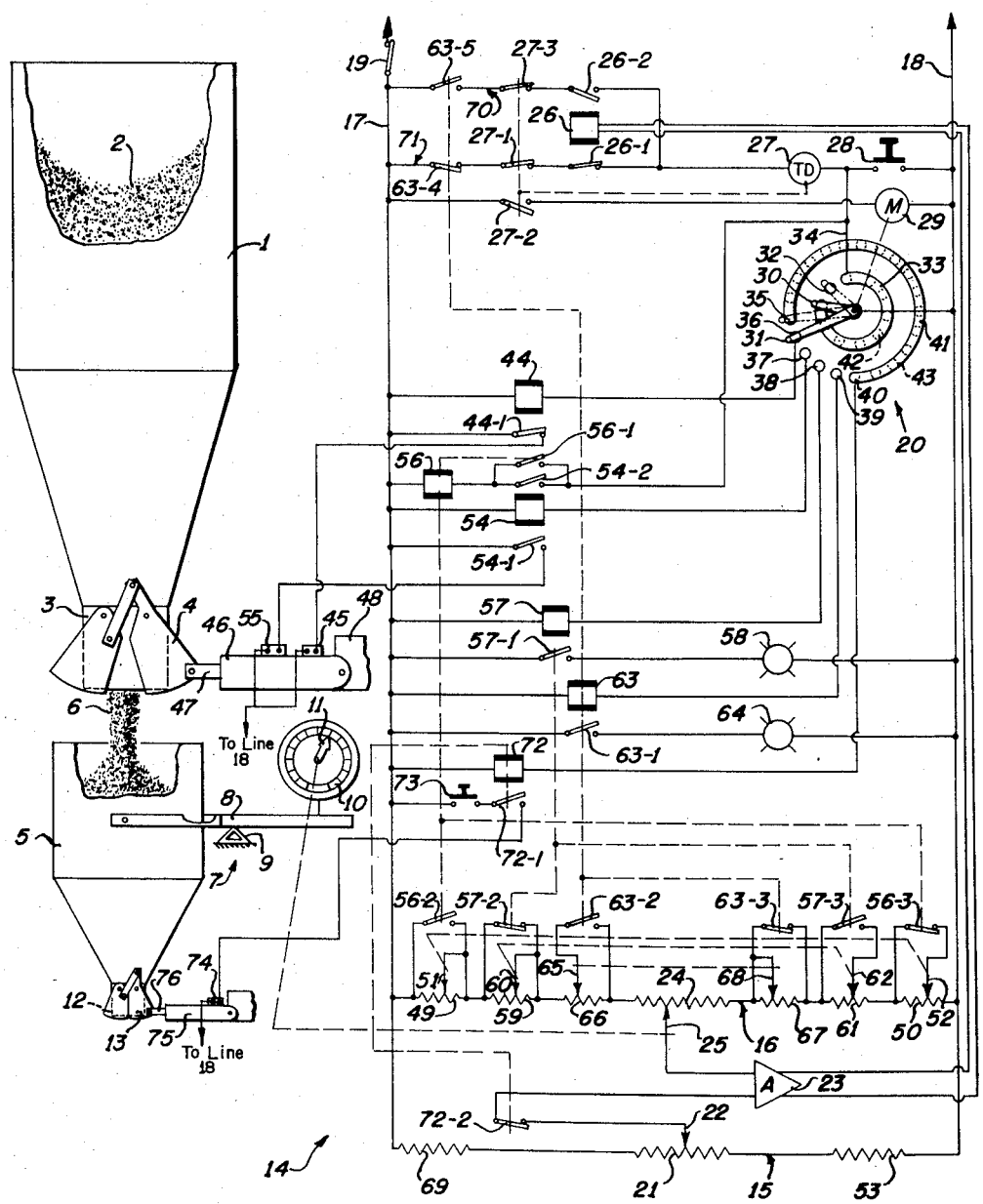
INVENTOR.
ALTON G. BALE, Jr.
BY
Andrus & Starke
ATTORNEYS United States Patent Office 2,954,202
Patented Sept. 27, 1960

2,954,202

AUTOMATIC CONTROL MEANS FOR
MATERIAL DELIVERY APPARATUS

Alton G. Bale, Jr., South Milwaukee, Wis., assignor to Wisconsin Electrical Manufacturing Company, Inc., Milwaukee, Wis., a corporation of Wisconsin Filed Apr. 15, 1958, Ser. No. 728,717

17 Claims. (Cl. 249—2)

This invention relates to an automatic control for material delivery apparatus and particularly to a control to insure meeting of predetermined tolerances in the quantity of material delivered.

In certain manufacturing processes, predetermined quantities of a material are successively taken from a central storage bin and inserted into the process. For example, in the batch process for making concrete and the like, predetermined quantities of sand, gravel and cement are mixed in each batch.

A particularly satisfactory control for discontinuing the feed of a particular material in response to receipt of a predetermined quantity of material is set forth in applicant's copending application entitled, Automatic Control For Material Distribution, Serial No. 699,571, filed November 29, 1957, now Patent No. 2,922,610, granted Jan. 26, 1960 and assigned to a common assignee with the present application. As more fully set forth therein, the control employs an input voltage signal and a cut-off voltage signal oppositely connected to an electrical control of the material feeding mechanism. The cut-off signal is responsive to the weight or other quantity characteristic of the material transferred to a receiving device from a storage bin by gravity feed or other suitable means. Separate voltage establishing means are connected in series with the weight responsive voltage signal or the input voltage signal to establish a compensating voltage to shift corresponding weight positions of the one signal means by a predetermined voltage. The compensating voltage level is set in accordance with the voltage level corresponding to the weight or other characteristic of the free-falling column of the material delivered from storage bin to the receiving device after material discharge from the bin stops. The additional compensating signal inserted in the circuit causes the two signals to reach the same relative level at a time somewhat prior to actual receipt of a corresponding weight of the material in the receiving receptacle. When this condition occurs, the further feed of material is instantly stopped. The free-falling column of material which is then delivered to the receiving device increases the weight of the material in the receiving device to the desired weight.

Although this method provides highly satisfactory results, it has been found difficult to deliver an exact predetermined quantity when a very rapid feed from the bin to the receiving device is employed.

Further, in road building and similar projects, governmental specifications establish the quantity and tolerances of each material which must be used in each batch of concrete, and the like. Severe penalties are attached for failure to comply with the specifications and it becomes exceedingly important that the material delivered is checked by reliable means to positively determine whether the quantities are within the established tolerances.

In accordance with the present invention, additional voltage compensating signals are established, separately or by control of the compensating signal of the previously referred to copending application, to first reduce the rate of feed prior to delivery of a predetermined quantity of material to more accurately control the material delivered and subsequently to establish a tolerance check to insure that the final weight of material delivered is within predetermined tolerances. Thereafter, the compensating signal may be employed to discharge the material and to reset the control apparatus to its initial position to control delivery of the next succeeding quantity of material.

Thus, in accordance with the present invention adjustable means are operably associated with the input signal and the cut-off signal to shift the relative electrical series of each in accordance with the quantity of material delivered to the receiving means subsequent to delivery from the bulk source at a predetermined time and also in accordance with the percentage deviation permitted by the tolerance limits.

The method of control and the corresponding apparatus of this invention provide relatively inexpensive and reliable means for delivering quantities of materials such as sand and accurately and automatically checking the quantity delivered.

The drawing furnished herewith illustrates the best method contemplated by the inventor for carrying out the invention.

The drawing is a schematic circuit diagram of the control circuit associated with diagrammatically illustrated components of a feed apparatus to clearly illustrate a preferred embodiment of the invention.

Referring to the drawing, a main storage bin 1 contains a relatively large quantity of sand 2 or other material which is gravity discharged through a bottom discharge opening 3. A suitable gate 4 normally closes the discharge opening 3 to retain the sand 2 within the bin 1.

The gate 4 is shown as a conventional jaw variety having a pair of channel shaped members pivotally secured to the walls of the discharge opening 3. The jaws of gate 4 are normally disposed immediately below the opening and are laterally swung from beneath the discharge opening to allow the sand 2 to fall freely from the bin 1 under the force of gravity.

A weighing hopper 5 is supported beneath the discharge opening 3 to receive the free-falling column 6 of sand.

The hopper 5 is coupled to a suitable scale 7 through a balance arm 8 which constitutes a part of the scale. The arm 8 is pivoted at an intermediate position on a fulcrum 9 and is secured at the outer end to the hopper 5. As the weight in hopper 5 increases, the arm 8 pivots about the fulcrum 9, counterclockwise in the drawing, and actuates the scale 7.

The scale 7 also includes a calibrated dial 10 which reads in suitable units of weight measurement or the like and a movable pointer 11 coupled to the opposite end of the balance arm 8 by any suitable means, not shown, for rotation in response to movement of the arm 8. A counter weight, not shown, is placed on arm 8 at the scale end to counterbalance the weight of the empty hopper 5 and establish a zero reading when the hopper 5 is empty. As the weight in hopper 5 increases, the pointer 11 moves across the calibrated dial 10 to show the weight in the hopper 5.

A discharge opening 12 having a jaw-type gate 13, similar to gate 4, is provided in the bottom of the hopper 5 to deliver the preselected quantity of sand from the hopper 5 to any suitable transporting device, not shown, such as a belt, truck, conveyor or the like.

An automatic control circuit 14 is provided to control the opening of the gate 4 to automatically deliver a predetermined quantity of sand 2 to the hopper 5.

The automatic control circuit 14 generally includes an input signal branch 15 and a cut-off or weight sensitive branch 16 which are connected in parallel with each other across a set of power lines 17 and 18. A master switch 19 is connected in line 17 to control connection of the control circuit to the source of power and auxiliary apparatus, not shown, which may be employed.

Although separate power lines are normally provided for the sensing circuit 14, a single set of incoming power lines 17 and 18 for the various components and elements is shown in the illustrated embodiment of the invention for purposes of more clearly illustrating the present invention.

The signal branches 15 and 16 are adapted to establish a command signal to selectively actuate a stepping relay or similar device 20 serving as a sequence control device. The mechanism 20 is shown as a motorized stepping switch which is adapted to successively establish branch control circuits to effect the following distinct functions during the material delivery process in response to successive automatically established signals:

(1) a rapid feed of the sand 2 from the bin 1 to the receiving hopper 5, (2) discontinue the rapid feed and establish a slow feed until the desired quantity of material is received in the receptacle, (3) check to insure that the quantity of material is within either the lower or upper tolerance limit, assumed to be the lower tolerance, (4) check to see that the weight is within the opposite tolerance, in the illustrated control being the upper tolerance, (5) allow discharge of the material delivered to the hopper if the material delivered is within the prescribed tolerances, and (6) automatically reset the control circuit to its initial standby position for controlling a subsequent delivery of a quantity of material.

As in the previously referred to copending application of the present applicant, the input signal branch 15 includes a manually set input potentiometer 21 of the resistance type. A movable tap 22 of the potentiometer 21 is adapted to be selectively positioned with the voltage of the tap 22 directly related to its position. The potentiometer 21 is assumed to establish arithmetically increasing electrical voltages as tap 22 moves from left to right in the drawing. In accordance with this assumption, the potentiometer 21 is calibrated with a 0% weight at the left end of the potentiometer in the drawing and with 100% weight at the opposite end of the potentiometer.

The potentiometer tap 22 is connected to the input of the amplifier 23 and the voltage therefrom biases the amplifier to conduct.

The amplifier 23 is any conventional or other suitable device; preferably of the transistor variety which is particularly rugged and adapted for industrial use.

The cut-off or weight sensitive branch 16 includes a weight controlled potentiometer 24. The potentiometer 24 is electrically similar to potentiometer 21 and is similarly calibrated. A potentiometer tap 25 is coupled to the scale mechanism or pointer 11 and positioned in accordance with the weight which is within the weighing hopper 5 as recorded by the scale 6. The output potential of the potentiometer 24 is fed by the tap 25 to the input of amplifier 23, but in such a manner as to bias the amplifier 23 to cut-off; that is, to not conduct.

Consequently, as long as the input tap 22 establishes a higher potential signal than the weight positioned tap 25, the amplifier 23 can conduct. However, as soon as the potential of tap 25 is equal to or greater than the potential of tap 22, the amplifier 23 is cut-off and cannot conduct. The comparison of these two potentials is employed in the present apparatus to effect the desired control of the material delivery system.

As the input potentiometer 21 and the cut-off potentiometer 24 are electrically the same, normally corresponding positions of the taps 22 and 25 on the corresponding potentiometers 21 and 24 establish corresponding output voltage signals.

In accordance with the present embodiment of the invention, the potential of the weight positioned tap 25 is modified in a predetermined manner to effect certain desired operations, as more fully described hereinafter.

A control relay 26 is connected in circuit with the output of amplifier 23 and is energized only when the amplifier conducts. Relay 26 is therefore energized whenever the potential of tap 22 is greater than the potential of the tap 25.

The relay 26 includes a first set of relay contacts 26–1 which are normally closed. The relay contacts 26–1 are serially connected with a timed delay relay 27 and a manually operated start button 28 in a series circuit across the power lines 17 and 18. Certain other subsequently described normally closed contacts are also connected in this series circuit for reasons more fully described hereinafter.

The start button 28 is normally open and is manually closed whenever it is desired to start delivery of a predetermined quantity of sand 2 from the storage bin 1 to hopper 5. When the switch button 28 is closed, the time delay relay 27 is energized and simultaneously actuates a first set of normally closed contacts 27–1 and a second set of normally open contacts 27–2.

The relay 27 is a timed delay relay having a delay both after energization and after de-energization. Thus, after button 28 is closed and timing delay relay 27 is energized, the corresponding contacts 27–1 remain closed for a short period of time and maintain energization of the relay 27–1 as long as button 28 is closed. After a predetermined period of time, the relay 27 opens the contacts 27–1 and is therefore de-energized. The relay 27 remains de-energized for the predetermined delay period until contacts 27–1 close and relay 27 is energized for a predetermined period.

Simultaneously with the opening of contacts 27–1, the relay contacts 27–2 close and remain closed for second delay period corresponding to the delay after de-energization of relay 27. Thus, contacts 27–1 and contacts 27–2 which are associated with relay 27 in effect chatter or continuously open and close as long as relay 27 is otherwise in completed energizing circuit.

A motor 29 of the stepping mechanism 20 is serially connected across power lines 17 and 18 with the relay contacts 27–2. Each period the contacts 27–2 remain closed, the motor 29 remains energized. A pair of separate or individual contact arms 30 and 31 are coupled to the output of the motor 29 in any suitable manner, not shown, and rotate each time the motor 29 is energized. The contact arms 30 and 31 are both electrically connected to the power line 18 and serve as a contact of the step switching mechanism 20.

The contact arm 30 is adapted to engage on electrically dead homing contact 32 or an arcuate contact 33 which is connected by a jumper lead 34 intermediate the connection of the time delay relay 27 and the starting button 28. The arm 30 is connected to the power line 18 and consequently, when the contact arm 30 engages the arcuate contact 33, the start button 28 is short circuited and the control circuit is latched across the power lines 17 and 18 for subsequent operation until contact arm 30 is driven to the homing contact 32.

Contact arm 31 is adapted to successively engage a homing contact 35 and a plurality of sequence contacts 36 through 40, which correspond generally to the sequential operations of the control apparatus previously set forth. Thus, contact 35 is a contact whereby the apparatus is in standby position. Contact 36 is the immediately successively engaged contact and establishes a branch circuit to rapidly feed the sand 2 from the storage bin 1 to the weighing hopper 5. The next succeeding contact 37 establishes a branch circuit to reduce the feed of sand 2 from bin 1 to a dribble or a very slow feed such that the effect of the free-fall column 6 is practically negligible. The following contact 38 establishes a branch circuit to check the lower tolerance within which the weight in the hopper 5 must fall. The next contact 39 establishes a branch circuit to check the upper tolerance within which the weight in the hopper 5 must fall. The contact 40 establishes a branch circuit which permits withdrawal or discharge of the sand 2 from the hopper 5. An arcuate contact 41 is integrally joined with contact 35 and contact 40, such that, the control apparatus returns to stand-by during the discharge operation.

The conventional stepping mechanism would normally include for the arcuate contacts 33 and 41 a plurality of circumferentially arrayed contact buttons, shown in phantom outline 42 and 43, upon the arcuate contacts which would be series connected by jumper leads, not shown, or the like to form the arcuate contacts.

The initial actuation of the start button 28 operates the stepping device 20 and the contact arms 30 and 31 move from the respective homing contacts 32 and 35 to the corresponding arcuate contact 33 and the first sequence control contact 36.

The energized relay 26 opens the associated contacts 26–1 to prevent operation of time delay relay 27. The relay contacts 27–2 open and prevent further operation of the stepping motor 29 and thereby hold the stepping mechanism 20 with contact arm 31 in engagement with the first sequence control contact 36. A fast-feed control relay 44 is connected in series with the contact 36 and the contact arm 31 across the power lines 17 and 18. A set of normally open relay contacts 44–1 are associated with relay 44 and are connected in series to the input terminal 45 of an electrically controlled motive power means 46.

The means 46 is generally shown as a fluid motor including an armature 47 which is pivotally secured at the outer end to one of the pair of jaws of gate 4. The armature 47 is biased by any suitable means, not shown, to hold the gate 4 in a closed position and prevent discharge through the bin opening 3. When relay contacts 44–1 close, the means 46 is energized to overcome the biasing means, not shown, and move the armature 47 through a relatively long stroke. The gate 4 is swung open to a maximum degree and allows sand 2 to fall freely through the opening 3 from the bin 1 into the weighing hopper 5.

The fluid motor 46 is pivotally secured to a stationary support 48 to allow longitudinal movement of the armature 47 and resultant pivotal movement of the attached jaw of gate 4.

As the sand 2 accumulates within the hopper 5, the scale 7 records the weight by suitable movement of the pointer 11. Simultaneously, the interconnected weight sensitive tap 25 moves upwardly along the potentiometer 24 and the potential of tap 25 increases accordingly.

A premature cut-off of the rapid feed of sand 2 is effected through suitable automatic actuation of a pair of preset resistive potentiometers 49 and 50 in a similar manner to the disclosure of the previously referred to copending application. The potentiometers 49 and 50 are series connected on electrically opposite sides of the potentiometer 24 with potentiometer 49 shown connected to the electrically low potential side of potentiometer 24. Suitable manually operable taps 51 and 52 on the corresponding potentiometers 49 and 50 are ganged for simultaneous movement in electrically opposite directions. Tap 51 is connected to the electrically high side of potentiometer 49 and tap 52 is connected to the electrically low side of potentiometer 50. Thus, as potentiometer tap 51 is adjusted to insert resistance of the potentiometer 49 into the circuit, the corresponding tap 52 of potentiometer 50 is simultaneously adjusted to remove a corresponding resistance from the series circuit. Consequently, the total resistance or voltage drop existing across the potentiometers 49, 24 and 50 is maintained constant at all times. The only effect of the potentiometers 49 and 50 is to shift the relative potential of the tap 25 of potentiometer 24 at any particular position of the tap. The total drop across the potential 24 remains the same at all times and is the same as the potential drop across the potentiometer 21.

A calibrating resistor 53 is connected in series with the potentiometer 21 and the resistance thereof is selected to maintain the total voltage drop across the series circuits including potentiometer 21 and potentiometer 24, the same. The resistor 53 compensates for the additional voltage drop inserted to either side of potentiometer 24 by the potentiometers 49 and 50 as well as certain additional voltage drops more fully described hereinafter.

Consequently, by the insertion of a portion or all of potentiometers 49 and 50 in the circuit, the potential of tap 25 for each possible setting on potentiometer 24 is adjusted upwardly; that is, has a higher potential by the amount of the voltage drop across the portion of the potentiometer 49 then connected in circuit. Consequently, during the operation of the apparatus the tap 25 arrives at a physical location on the potentiometer 24, corresponding to a smaller calibrated weight than is actually present in the hopper 5. The potential of tap 25 at this physical location, however, corresponds to the higher potential in accordance with the additional potential drop across potentiometers 49 and 50. Therefore, the relative potentials of taps 22 and 25 reach a corresponding value before the predetermined desired final weight, preset upon the input potentiometer 21, is disposed within the weighing hopper 5.

The amplifier 23 is then biased to cut-off and ceases to conduct. Consequently, the relay 26 is de-energized. The relay contacts 26–1 then close and operate to energize the time delay relay 27. After a predetermined period of time, the relay contacts 27–1 and relay contacts 27–2 operate to respectively open the circuit to the time delay relay 27 and to close the circuit to the stepping motor 29. When the motor 29 is energized, the contact arms 30 and 31 are driven in a counterclockwise direction as viewed in the drawing.

Contact arm 30 remains in engagement with the arcuate contact 33 to maintain the latch about start button 28.

The contact arm 31 disengages contact 36 and engages contact 37. When the contact arm 31 disengages contact 36, the relay 44 is de-energized and the associated contacts 44–1 open. The circuit to the input control terminals 45 is then open and the motor 46 deactivated. As previously noted, the motor 46 has the associated armature 47 biased to close the gate 4. Therefore, upon motor deactivation, gate 4 rapidly closes and discontinues further discharge of sand 2 from the storage bin 1 to the weighing hopper 5.

However, when contact arm 31 engages contact 37, a slow feed relay 54 is connected across the power lines 17 and 18 in series with contact 37 and the contact arm 31. The relay 54 controls a set of normally open contacts 54–1 which are connected in series to a second set of input terminals 55 which are adapted to establish a second operation of the motor 46. This second operation of the motor 46 is adapted to only slightly open the gate 4 and provide a very slow feed of sand 2 from the storage bin 1 to the hopper 5. The slow feed is maintained for a period of time co-incident with engagement of contact arm 31 and contact 37.

The relay 54 controls a second set of normally open contacts 54–2 which are serially connected with a latch-out relay 56 and the arcuate contact 33 and contact arm 30 across the power lines 17 and 18.

The relay 56 actuates a first set of contacts 56–1 which are connected in parallel with contacts 54–2 to maintain energization of relay 56 independently of relay 54 after the initial energization of relay 56.

The relay 56 also controls a set of normally open relay contacts 56–2 and a set of normally closed relay contacts 56–3.

The relay contacts 56–2 are normally open contacts which are connected in short circuit relation across the potentiometer 49. When the relay 56 is energized, the relay contacts 56–2 close and thereby short circuit the potentiometer 49 and completely disconnect the potentiometer from the weight sensitive circuit 16 until contact arm 30 disengages the arcuate contact 33.

The contacts 56–3 are a set of normally closed contacts which are connected in series with the potentiometer tap 52 of potentiometer 50. When the relay 56 is energized, the relay contacts 56–3 open and thereby insert the complete resistance of the potentiometer 50 in the weight sensitive circuit 16. Consequently, the total resistance inserted in the weight sensitive circuit 16 by the simultaneous action upon potentiometers 49 and 50 is maintained at a constant value.

Electrically, the disconnection of potentiometer 49 from the weight sensitive circuit 16 and the connection of potentiometer 50 into the circuit 16, shifts the potentiometer 24 downwardly to a non-compensated electrical position with respect to the potentiometer 21. Thus, a relatively direct comparison between the potential of taps 22 and 25 is now established.

The tap 25, as previously noted, is located on the potentiometer 24 at a lower relative potential or calibrated position than the tap 22 because of the prior action of the premature cut-off potentiometers 49 and 50. The additional voltage drop across the potentiometer 49 established similar voltage levels on tap 22 and tap 25. Therefore, when potentiometer 49 is removed from the circuit, the potential of tap 25 is reduced by the amount of the potential drop which existed across the potentiometer 49 connected in the circuit 16. The amplifier 23 therefore again conducts and energizes relay 26.

When the relay 26 is energized, the stepping motor mechanism 20 is again prevented from moving contact arms 30 and 31 until relay 26 is de-energized, as previously described.

The sand 2 slowly feeds into the weighing hopper 5 until the weight in the hopper 5 moves the tap 25 into a position establishing a potential corresponding to the potential of tap 22. The operation of the amplifier 23 is then again discontinued or cut-off.

The slow feed greatly reduces the size of the free-falling column 6 of sand 2 and consequently, the existing free-falling column does not affect the weight in the weighing hopper 5 to an appreciable extent.

When the amplifier 23 stops conducting the relay 26 is de-energized and the associated contacts 26–1 are closed to energize time delay relay 27 which then operates to effect actuation of the stepping device 20, in a manner similar to that previously described.

The contact arm 30 still remains in engagement with the arcuate contact 33 to maintain the latch about the start button 28. The holding circuit to relay 56 is also now maintained completed thereby.

The contact arm 31 moves from engagement with contact 37 to engagement with the under-tolerance-check contact 38.

When the contact arm 31 disengages contact 37, the slow-feed relay 54 is de-energized and the relay contacts 54–1 open. The motor 46 is de-energized and the gate 4 is closed to stop further feed of sand 2 from storage bin 1 to the hopper 5.

When the contact arm 31 engages contact 38, a series circuit is completed to an under-tolerance-check relay 57 which is connected across power lines 17 and 18 in series with contact 38 and contact arm 31.

The relay 57 controls a first set of normally open contacts 57–1. A lamp 58 is connected across the power lines 17 and 18 in series with the contacts 57–1 and is therefore illuminated immediately upon energization of the relay 57. When the lamp 58 is lit, it indicates either that the under-tolerance-check has not been completed or that the weight within the hopper 5 does not lie within the required lower tolerance.

The relay 57 also simultaneously controls a second set of normally closed contacts 57–2 which are connected in parallel with a potentiometer 59. The potentiometer 59 is connected in series circuit with the weight sensitive potentiometer 24 to the electrically low side of the potentiometer 24 and includes a movable tap 60 to adjust the position of the potentiometer connected in circuit. When the relay 57 is energized, the relay contacts 57–2 open and the predetermined portion of the potentiometer 59 is connected in the series circuit. The insertion of this resistance increases the potential of tap 25 according to the voltage drop across the portion of the connected potentiometer 59 connected in the circuit 16.

To maintain the total drop across the potentiometer 24 constant, a second potentiometer 61 is series connected to the high side of potentiometer 24. The second potentiometer 61 includes a tap 62 which is connected to the electrically low side of the potentiometer 61 in series with a set of normally open contacts 57–3 of relay 57. The potentiometer 61 is normally connected in the circuit while the potentiometer 59 is normally short circuited. The taps 60 and 62 are ganged together for simultaneous, opposite settings. Thus as tap 60 is moved to increase the portion of the potentiometer 59 adapted to be connected in the weight sensitive circuit 16 by operation of contacts 57–2, the tap 62 of potentiometer 61 correspondingly moves to reduce the portion of the potentiometer 61 adapted to be short circuited from the circuit 16.

The taps 60 and 62 are positioned to insert a voltage drop in the weight sensitive circuit 16 to the low potential side of potentiometer 24 in accordance with the weight difference between the required weight and the lower tolerance weight.

The corresponding similar voltage drop across potentiometer 21 and 24 is maintained by the calibrating resistance 53 which is established to correspond to the total resistance added in the weight sensitive circuit 16 due to the various connections of potentiometers 49, 50, 59 and 61.

With the potentiometers 59 and 61 operatively connected in circuit 16, the control circuit 14 functions as follows: Assume that the operator adjusts the preset potentiometer tap 22 at 50% weight and that the lower tolerance figure is 48% weight. Assume also that during the delivery of the sand 2 from the storage bin 1 to the weighing hopper 5, the workman touched the scale 7 and caused the weight recorded to increase and move tap 25 to a cut-off potential even though the actual weight of the sand 2 received in the hopper 5 is below such level. The control circuit 14 is thus actuated to establish energization of the under-tolerance-check relay 57 as the control circuit is unable to distinguish between this accidental increase in weight and an actual increase in weight.

When the contacts 57–2 open, a portion of the potentiometer 59 is inserted in the weight sensitive circuit 16 and the potential of the potentiometer tap 25 is increased accordingly and by an electrical equivalent of the negative weight deviation allowed by the specified tolerance. If tap 25 is still at a lesser potential than the tap 22, the amplifier 23 conducts and establishes a signal which energizes relay 26. When relay 26 is energized the associated contacts 26–1 open and the stepping mechanism 20 is prevented from movement. The lamp 58 remains illuminated, indicating that the weight is below the lower tolerance.

If the tap 25 is still below the potential of tap 22, the value or weight of the sand 2 actually in the weighing hopper 5 must be less than the weight at the lower tolerance limit. Thus, assuming the 2% tolerance figure, it means that the weight of the sand 2 in the hopper 5 must be less than 48% of the actual preset weight or set up established on the input potentiometer 21. This is true because, if the actual weight of sand 2 in hopper 5 is above 48% of the preset weight and consequently within the lower tolerance, the potentiometer tap 25 is positioned upon potentiometer 24 at a location corresponding to more than a 48% setting. When the 2% compensating or tolerance checking voltage, established by potentiometer 60, is inserted in series with the potentiometer 24, the potential of tap 25 shifts electrically above the 50% figure and bias amplifier 23 to cut-off. Only if the actual weight of sand in hopper 5 is below 48% and consequently not within the lower limit, can the potential of tap 25 remain below the potential of tap 22 and bias amplifier 23 to conduct.

As long as tap 25 now remains below the potential of tap 22 to bias amplifier 23 to conduct, the lamp 58 remains illuminated, indicating to the operator that the weight of sand in the weighing hopper 5 is not within the lower tolerance. The operator then manually or through some other remote control apparatus, not shown, inserts additional sand into the weighing hopper 5.

As soon as the sand added to the hopper 5 is increased to position the tap 25 to a potential which is greater than that of tap 22, the amplifier 23 is cut-off and the relay 26 de-energized. The relay contacts 26–1 then close to allow energization of timing relay 27 and the resultant operation of the stepping mechanism 20.

Stepping mechanism 20 then moves the contact arm 31 from engagement with the under-tolerance-check contact 38 to an over-tolerance-check contact 39.

Assume that the increase in potential of tap 25 due to the insertion of the portion of potentiometer 59 during the under-tolerance-check increases the potential of tap 25 to a value greater than that of tap 22. This would mean that the weight of sand in the hopper 5 was originally within the permitted tolerance limits as previously described. The amplifier 23 is then cut-off and relay 26 is de-energized. Relay contacts 26–1 are consequently closed and the stepping mechanism 20 is actuated to disengage contact arm 31 for contact 38 and to engage contact arm 31 with contact 39.

When the contact arm 31 disengages contact 38, the relay 57 is de-energized and the relay contacts 56–1 open. The under-tolerance indicating lamp 58 is then shut off.

Simultaneously, the relay contacts 57–2 and 57–3 respectively close and open to return the weight sensitive circuit 16 to its original or normal condition which existed just prior to the under-tolerance-check.

When the contact arm 31 engages contact 39, it establishes a circuit through a relay 63 which is connected in series with the relay contact 39 and the contact arm 31 across the power lines 17 and 18. The relay 63 controls a first set of normally open contacts 63–1 which are connected in series with a lamp 64 across the power lines 17 and 18 to illuminate the lamp 64 until the over-tolerance-check shows the correct weight of sand existing in the hopper 5.

The relay 63 simultaneously controls a second set of relay contacts 63–2 which are normally open contacts connected in series circuit with a tap 65 of an over-tolerance-check potentiometer 66. The latter is connected in series with the potentiometer 24 to the low potential side of the potentiometer 24 and the tap 65 is connected to high potential side of potentiometer 66 to adjust the portion thereof connected in circuit. As the contacts 63–2 are normally open, the complete resistance of potentiometer 66 is connected in series circuit with the potentiometer 24.

A second over-tolerance-check potentiometer 67, equal in value electrically to potentiometer 66, is connected in series circuit with the potentiometer 24 on the high potential side of the potentiometer 24. The potentiometer 67 includes a tap 68 which is connected to the low potential side of potentiometer 67 and is ganged to tap 65 of potentiometer 66. The simultaneous movements of taps 65 and 68 affect a reverse insertion of resistance in the series weight sensitive circuit 16 in a manner similar to the previously described pairs of potentiometers. A set of normally open relay contacts 63–3 are connected in parallel with the potentiometer 67.

A zero calibrating resistor 69 is connected to the low side of the potentiometer 21 and equals the resistance value of potentiometer 66 to maintain the relative initial setting of the potentiometer 24 and potentiometer 21 at a corresponding potential, much in the same manner as the calibrating resistor 53.

The effect of the operative connection of potentiometers 66 and 67 in the weight sensitive circuit 16, by the simultaneous operation of relay contacts 63–2 and 63–3, is to electrically shift potentiometer 24 downwardly with respect to potentiometer 21 in accordance with the setting of taps 65 and 68. That is, the potential of tap 25 and tap 22 for corresponding positions results in a higher potential on tap 22 than on tap 25. This results because a portion of the potentiometer 66 is removed from the circuit when contacts 63–2 close and the voltage drop which is existed thereacross is subtracted from the voltage reading of tap 25. A corresponding voltage drop is added to the high side of potentiometer 24 by the insertion of a corresponding portion of potentiometer 67.

If the weight of sand 2 in the hopper 5 is greater than the weight permitted by the upper tolerance, the reduction in the potential of tap 25 is insufficient to move the tap below the potential of the tap 22. Consequently, if the weight is not within the upper limit, the amplifier 23 is cut-off because the potential of tap 25 does not drop below the potential of tap 22.

If the amplifier does not conduct, the relay 26 is de-energized and the relay contact 26–1 remains close. This would normally permit operation of the stepping device 20. However, as described the weight of the sand in the hopper 5 is not within the prescribed tolerance and therefore the apparatus should shut off.

This is accomplished by operatively inserting an alternate control line 70 in the control circuit 14 during the over-tolerance-check. The alternate control line 70 is connected in parallel with a portion of the main control line 71 and in series with relay 27 to operate the time delay relay 27.

A fourth set of normally closed contacts 63–4 of the over-tolerance-check relay 63 are connected in series with the time delay relay 27 in the main control line 71. The relay contacts 63–4 open and operatively disconnect the main control line during the over-tolerance-check.

The over-tolerance-check relay 63 includes a fifth set of relay contacts 63–5 serially connected in the alternate control line 70. The relay contact 63–5 are normally open and prevent effective operation of the control lines 70. However, when relay 63 is energized, the relay contacts 63–5 close and operatively established line 70.

The relays 26 and 27 are each provided with a set of separate contacts 26–2 and 27–3, respectively, which contacts are serially connected with the relay contacts 63–4 in the alternate control line 70.

The relay contacts 27–3 are normally closed contacts and operate in exactly the same manner as do 27–1 in the main control line 71.

The relay contacts 26–2 are normally open contacts and therefore function in the reverse of the manner in which contacts 26–1 function. Therefore, the time delay relay 27 is energized during the over-tolerance-check only if a signal is received from the amplifier 23 to energize relay 26 and close contacts 26–2. If no signal is received, as when the weight of the sand 2 in hopper 5 is above the upper tolerance, the contacts 26–2 remain open and prevent operation of the time delay relay 27 and consequently, operation of the stepping device 20.

Consequently, the stepping device 20 is locked in the over-tolerance-check position and maintains energization of relay 63. The associated relay contacts 63–1 are held closed and maintain illumination of the lamp 64. The operator then knows that too much sand 2 has been deposited in the hopper 5. Sand is either manually or through some automatic mechanical means, not shown, removed from the hopper 5. When sufficient sand is removed to decrease the weight in the hopper 5 and to correspondingly move tap 25 downwardly to a position where the potential is below that of tap 22, the amplifier 23 conducts and energizes relay 26. The relay contacts 26–2 are then closed and the alternate control line 70 is completed through the time delay relay 27–3 and the now closed relay contacts 63–5 and relay contacts 26–2. The time delay relay 27 is energized thereby and actuates the stepping device 20 to move the associated contact arms 30 and 31.

This same action occurs if the weight of sand within the weighing hopper 5 was originally within the upper tolerance limits.

Thus, assume that 1% additional weight had been deposited in the hopper 5. The potentiometer tap 25 is a potential position on potentiometer 24 corresponding to this additional 1%. However, when the potentiometer 66 and 67 are inserted in the weight sensitive circuit 16 effectively the potential of tap 25 is reduced by the 2% of the calibration. It thus reduces the setting electrically from 51% to 49% weight. The tap 22 however is set at 50% calibration and therefore is at a higher potential than tap 25. The amplifier 23 conducts and energizes relay 26.

The relay contacts 26–2 in alternate control line 70 which is now operative in circuit close and actuate the stepping device 20.

The stepping device 20 drives the associated contact arm 31 which disengages contact 39 and move into engagement with contact 40.

When contact arm 31 is disengaged from contact 39, the over-tolerance-check relay 63 is de-energized and the associated contacts 63–1 through 63–5 revert to a normal position.

The relay contacts 63–1 open and break the circuit of lamp 64 to indicate that the upper tolerance is met.

When relay 63 is de-energized, the associated contacts 63–2 and 63–3 return to the normally open and closed position, respectively, and re-establish weight sensitive circuit 16 to standby position with the over-tolerance-check potentiometers 66 and 67 effectively removed from the circuit.

Simultaneously, the contacts 63–4 close and the contacts 63–5 open to operatively disconnect the alternate control line 70 and to operatively connect the main control line 71 in operation to control the operation of the stepping device 20.

When the contact arm 31 engages contact 40 a circuit is completed to a discharge and reset relay 72, which is connected in series circuit with contact 40 and contact arm 31 across the power lines 17 and 18. The relay 72 includes a set of normally open contacts 72–1 which are connected across the power lines 17 and 18 in series with a normally open discharge switch 73 and an electrical input control terminal 74 of an electrically controlled device which is illustrated as a fluid motor 75.

The fluid motor 75 is generally similar to the motor 46 except that it is a single acting device. The motor 75 includes an armature 76 which is connected to the gate 13 of hopper 5 and is biased to normally hold the gate closed. When contacts 72–1 are closed and the discharge switch 73 is closed, the motor 75 is connected across lines 17 and 18 in a completed circuit and energized to open gate 13. The sand 2 within the weighing hopper 5 is then allowed to discharge downwardly to any suitable storage or conveying means, not shown.

As the weight in the weighing hopper 5 decreases, the tap 25 moves downwardly accordingly and the potential thereof rapidly becomes less than that of the tap 22. The amplifier 23 is then normally biased to conduct and to operate relay 26 to prevent operation of stepping device 20. However, the relay 72 also includes a set of normally closed contacts 72–2 which are serially connected with the tap 22 to the input of the amplifier 23 and being normally closed permit the previously described operation of circuit 14. When the relay 72 is energized, the associated contacts 72–2 open and prevent biasing of the amplifier 23 to conduct. Consequently, the relay 26 remains de-energized until the relay 72 is de-energized.

The relay contacts 26–1 remain closed and the timing relay 27 operates to energize the stepping device 20. The contact arms 30 and 31 are intermittently continuously driven as the relay contacts 27–1 and 27–2 intermittently open and close.

When the contact arm 30 moves around and disengages arcuate contact 33 and engages the home button 32, the latch circuit across the start button 28 is broken and the time delay relay 27 is de-energized and cannot again be energized until the start button 28 is actuated. Consequently, the further operation of the stepping device 20 is discontinued.

The breaking of the latch circuit across start button 28 also opens the circuit through relay 56 and the cooperating contacts 56–1 open. Relay 56 remains de-energized until subsequent energization of the slow feed relay 54, as previously described.

The relay contacts 56–2 return to the normally open position and the relay contacts 56–3 return to the normally closed position. The premature cut-off potentiometers 49 and 50 are consequently again operatively connected in the weight sensitive circuit 16 and operate in a manner, as described hereinbefore.

The contact arm 31 now engages the homing contact 35. However, due to the arcuate contact 41 which joins contact 40 and contact 35, the relay 72 remains energized. Consequently, the discharge circuit to the fluid motor 75 can be completed through actuation of the discharge switch 73 to continue the discharge of the sand from the weighing hopper 5.

The relay 72 maintains contact 72–2 open and prevents conduction by amplifier 23 to energize relay 26. Therefore relay contacts 26–1 remain closed and the main control line 71 to time delay relay 27 is in a state to energize relay 27 whenever the start button 28 is actuated.

Further, when the contact or start button 28 is actuated to start a subsequent operation of the control circuit 14, the amplifier 23 cannot conduct until the contact arm 31 has moved from engagement with the home position contact 35 to the initial rapid feed contact 36. Until movement of contact arm 31 from contact 35, the relay 72 remains energized and breaks the circuit from the potentiometer tap 22 to amplifier 23. The relay 72 is de-energized as soon as contact arm 31 leaves contact 35 and the associated contacts 72–2 open, whereby the input tap 22 is again connected to amplifier 23 and will bias the amplifier 23 to conduct.

The amplifier 23 energizes relay 26 which will open the associated contacts 26–1 and again stop further movement of the stepping device 20 and the previously described sequence is again established.

The operation of the illustrated embodiment of the invention is summarized as follows.

The operator presets the potentiometer tap 22 on potentiometer 21 to the desired weight setting in accordance with weight of sand 2 to be delivered from the storage bin 1 to the weighing hopper 5 during one cycle of operation. The master switch 19 is closed to connect the control circuit to the power supply, not shown, through power lines 17 and 18.

The start button 28 is depressed and completes the circuit through time delay relay 27 which then actuates the associated contacts 27–1 and 27–2 to operate the stepping motor 29 of stepping mechanism 20. The respective contact arms 30 and 31 of stepping mechanism 20 move to the first operating position.

The contact arm 30 engages the arcuate contact 33 to short circuit the start button 28 and latch the time delay relay 27 in circuit.

The contact arm 31 engages the rapid-feed contact 36 and completes the circuit through relay 44. The associated relay contacts 44–1 close and energize the fluid motor 46 to open the gates 4 to a maximum extent. The sand 2 rapidly discharges from the storage bin 1 to the weighing hopper 5 as a free-falling column 6.

When the contact arm 31 moves from contact 35 to contact 36, the series circuit through the discharge relay 72 is opened and the discharge contact 72–1 open. The gates 12 close and prevent discharge of material from the weighing hopper 5 until a cycle of operation is completed. Simultaneously, the relay contact 72–2 close and establish a signal from the amplifier 23 to control relay 26. The relay contacts 26–1 open and prevent further operation of time delay relay 27 and stepping mechanism 20.

The weight sensing tap 25 is initially at a zero reading position in accordance with the zero reading of the scale 7. Consequently, the amplifier 23 is biased to conduct by the potential of tap 22 and a signal is established to the relay 26.

The sand 2 continues to discharge into the weighing hopper 5 and the increased weight is correspondingly recorded on the scale 7.

The tap 25 moves along the potentiometer 24 in accordance with the increased weight in the weighing hopper 5.

The potentiometers 49 and 50 are connected in circuit through the normally open contacts 56–2 and the normally closed contacts 56–3 to electrically shift the potentiometer 24 and establish equal potentials on taps 22 and 25 prior to receipt of the preset input of sand 2. The equal potentials on taps 22 and 25 bias the amplifier to cut off. When the signal from the amplifier 23 ceases, the stepping relay 26 is de-energized and a stepping mechanism 20 is energized to move the contact arms 31 into engagement with the slow-feed contact 37. Consequently, the rapid feed of the sand 2 from the storage bin 1 to the weighing hopper 5 is discontinued and a slow feed is established as follows.

Engagement of contact arm 31 and contacts 37 completes a circuit through relay 54. The relay contacts 54–1 close and energize motor 46 to partially open gates 4 and establish a slow feed of material from the storage bin 1 to the weighing hopper 5.

The relay 54 simultaneously closes the contact 56–2 and opens contact 56–3 to operatively disconnect the potentiometers 49 and 50 from the circuit and provide a relative electrical correspondence between the series of electrical signals established by potentiometers 24 and 21. Consequently, sand 2 is continuously fed to the weighing hopper 5 until approximately the correct weight is disposed within the weighing hopper 5. The free fall column 6 at this point, is a relatively thin, small column, and consequently does not appreciably effect the total weight in the weighing hopper 5.

When the potentiometer taps 25 and 22 are again essentially equal to each other, the signal from the amplifier 23 ceases and the relay 26 is de-energized and the contact 26–1 close. The stepping mechanism 20 is then operated to move the contact arm 31 from contact 37 into engagement with contact 38.

The circuit is then completed through the under-tolerance-check relay 57 which closes the contacts 57–1 to light lamp 58. The relay 57 also opens the contacts 57–2 and closes the contacts 57–3. The potentiometers 59 and 61 are then operatively connected in circuit with the potentiometer 24 to automatically check the lower tolerance, as previously described. If the weight in the hopper 5 is within the prescribed tolerance, the amplifier 23 is biased to cut off and the relay 26 de-energized. The stepping mechanism 20 then operates to move the contact arm 31 from engagement with contact 38 and into engagement with contact 39.

This completes a circuit through the relay 63 which closes the associated relay contacts 63–1 to illuminate light 64 until such time as the over-tolerance-check is completed satisfactorily. The relay 63 also closes contacts 63–2 and opens contacts 63–3 to operatively connect potentiometer 66 and 67 in circuit with the potentiometer 24. Relay 63 further operates to open contacts 63–4 in line 71 and to close contacts 63–5 in line 70 to reverse the functional operation of relay 26. As previously described, the sensing circuit 14 is then in condition to sense the upper tolerance condition of the sand 2 in the hopper 5.

If the weight checks out correctly, the amplifier 23 is biased to conduct and the relay 26 is energized to close the associated contacts 26–2 in line 70. The stepping mechanism 20 then operates to move contact arm 31 into engagement with the discharge contact 40. However, if the weight in the hopper 5 is not within the prescribed tolerance, the amplifier 23 is biased to cut off and relay 26 is deenergized. The relay contacts 26–2 remain open and prevent operation of stepping mechanism 20. The lamp 64 is maintained lit until the excess weight of sand 2 is removed from hopper 5.

When the upper tolerance is met, the stepping mechanism 20 moves the contact arm 31 into the discharge contact 40 to energize the discharge relay 72. The contact 72–1 then close to allow discharge from the weighing hopper 5 through operation of push button 73.

Simultaneously, the contacts 72–2 open to disconnect the preset input potentiometer 21 from the amplifier 23 and therefore prevent conduction from amplifier 23. Consequently, the relay 26 is maintained de-energized and the relay 26–1 contacts remain close. The stepping mechanism 20 then continues to operate to reset the contact arms 30 and 31 to a home position with contact arm 31 in engagement with the contact 35 and contact arm 30 in engagement with the contact 32.

The apparatus is then in standby condition and upon operation of push button 28 completes another cycle of operation.

The illustrated embodiment of the invention establishes a weight sensitive latch of the discharge gates of the weighing hopper incident to an unfavorable tolerance inspection which latch may be circumvented by forcibly moving the scale mechanism or the like. The apparatus may also include any suitable positive locking means operated incident to an unfavorable tolerance inspection to prevent any such circumvention.

Although the illustrated embodiment of the invention employed resistive potentiometers, any other suitable voltage establishing means may be employed to electrically vary the relative calibration of the potentiometers 21 and 24 or the like in accordance with the above described method of operation. Further, the various control potentiometers or the like may be inserted in circuit with the preset potentiometer 21 with the connections operatively reversed in order to affect a similar functioning of the control apparatus.

Suitable automatic switching may be provided to successively deliver different materials to the weighing hopper from a plurality of storage means to automatically form a final mixture or batch of materials.

The present invention provides a simple, reliable and accurate control in the delivery of granular products and the like to positively insure delivery of material within predetermined tolerance requirements.

Various modes of carrying out the invention are contemplated as being within the scope of the following claims particularly pointed out and distinctly claiming the subject matter which is regarded as the invention.

I claim:

1. An automatic control for delivering a predetermined quantity of material from a bulk source to a receiving means, which comprises feed control means including signal means established by comparison of a preset signal means and a receiving signal means responsive to receipt of material to discontinue delivery of the material from the bulk source incident to delivery of substantially said predetermined quantity, inspection means responsive to said feed control means to automatically shift the preset signal means and the receiving signal means relative each other in accordance with predetermined tolerances to check the variation of material received with respect to a predetermined tolerance, and means operably coupled with said inspection means to control discharge of the material in the receiving means and allow discharge only where said delivered material received is within the predetermined tolerance.

2. An automatic control for feeding a predetermined quantity of material from a bulk source to a receiving means within a predetermined upper and lower tolerance, rapid-feed means to establish a rapid feed of material from said bulk source to said receiving means, quantity sensitive means operably coupled with said receiving means and adapted to operably de-energize said last named means incident to delivery of less than said predetermined quantity, slow-feed means responsive to said de-energization to establish a slow feed of material from said bulk source to said receiving means, said quantity sensitive means being operably coupled with said slow-feed means to operably de-energize said slow-feed means incident to delivery of substantially said predetermined quantity of material, discharge means in said receiving means, means responsive to said de-energization of the slow-feed means to compare the quantity of material delivered with one of said tolerances and to latch said discharge means in a non-operable position if the tolerance is exceeded, means responsive to a favorable comparison to compare the quantity of material delivered with the other of said tolerances and to latch said discharge means in a non-operable state if the second tolerance is exceeded, and discharge control means and interlock means responsive to a favorable second comparison to latch said discharge control means in an operable state.

3. An automatic control for feeding a predetermined quantity of material with a prescribed upper and lower tolerance from a source to a receiving means, which comprises preset input means adapted to selectively establish one of a linear series of electrical input signals corresponding to several quantities of material transferable from the source, means adapted to establish like electrical signals in proportion to material received in said receiving means, means to compare said one selected input signal and said last named signals to control feeding of material to the receiving means, means operably coupled with said first and second named means to shift the respective electrical series relative to each other, and automatic switching means operably coupled with said last named means to shift said electrical series to compare the material delivered to the receiving means with a predetermined tolerance in the quantity of the material delivered.

4. An automatic control for feeding a predetermined quantity of material with a prescribed upper and lower tolerance of material from a source to a receiving means, which comprises preset input means adapted to selectively establish one of a logical series of electrical input signals corresponding to the quantity of material to be delivered from the source, means adapted to establish like series of electrical signals in proportion to material received in said receiving means, means to compare said one selected input signal and said last named signals to control feeding of material to the receiving means, adjustable means operably coupled with said first and second named means to shift the respective electrical series relative to each other in accordance with said logical series, and automatic switching means operably coupled with said last named means to shift said electrical series to compare the material delivered to the receiving means with a predetermined tolerance in the quantity of the material delivered.

5. An automatic control for feeding a predetermined quantity of material with a prescribed upper and lower tolerance of material from a source to a receiving means, which comprises adjustable voltage establishing means adapted to selectively establish one of a logical series of voltage signals corresponding to the quantity of material transferable from the source, means adapted to establish a like series of voltage signals in proportion to the material received in said receiving means, means to compare said voltage signals and establish an output signal to control feeding of material to the receiving means and to cut off said feed incident to a predetermined relation therebetween, adjustable voltage establishing means adapted to be operably connected with said first and second named means to shift the voltage series relative to each other in accordance with said logical series, and automatic switching means operably coupled with said last named voltage establishing means to selectively connect the same to shift said electrical series in accordance with a predetermined tolerance in the quantity of the material delivered incident to establishment of said output signal to cut off.

6. An automatic control for feeding a predetermined quantity of material with a prescribed upper and lower tolerance of material from a source to a receiving means, which comprises preset input potentiometer means adapted to selectively establish one of a linear series of electrical input signals corresponding to the quantity of material to be delivered from the source, a quantity sensitive potentiometer means adapted to establish like electrical signals in proportion to material received in said receiving means, means to compare the output signals of said potentiometers and to establish a signal to control feeding of material to the receiving means, adjustable potentiometer means connected in circuit with said input potentiometer and second quantity sensitive potentiometer means and adapted to shift the respective electrical series relative to each other, and automatic switching means operably coupled with said last named potentiometer means to selectively operably connect and operably disconnect said last named potentiometer from circuit to selectively shift said electrical series to compare the material delivered to the receiving means with a predetermined tolerance in the quantity of the material delivered.

7. An automatic control for delivering a predetermined quantity of material from a bulk source to a receiving means, which comprises signal generating means adapted to establish a signal proportional to the quantity difference between said predetermined quantity and the delivered quantity, first circuit means to control delivery of the material from the bulk source, second circuit means operatively coupled with said signaling means to automatically compare the variation of material received with respect to predetermined tolerance, third circuit means to control discharge of the material in the receiving means and to allow discharge only where said material received is within the predetermined tolerance, a stepping switch connected to the output of said signal generating means to successively complete said third circuit means, and means responsive to an out-of-tolerance comparison by said second circuit means to prevent operation of said stepping switch to complete said third circuit means.

8. An automatic control for feeding a predetermined quantity of material from a bulk source to a receiving means within a predetermined upper and lower tolerance, which comprises means to establish an input signal proportional to the quantity of material to be transferred, quantity sensitive means operably coupled with said receiving means to establish a corresponding electrical feed signal, a feed control circuit to establish a rapid feed from said bulk source to said receiving means, comparison means adapted to establish an output signal incident to a predetermined difference between said input signal and said feed signal, circuit means to control discharge of material from said receiving means, circuit means adapted to shift said input signal and said feed signal relative to each other in accordance with one of said tolerances, circuit means adapted to shift said input signal and said feed signal in an opposite direction relative to each other in accordance with the other of said tolerances, a stepping switch adapted to successively complete said feed circuit and the tolerance comparing circuit and the discharge circuit means incident to said output signal, and means to prevent establishment of an output signal incident to an out of tolerance response in either of said tolerance checking circuit means.

9. An automatic control for feeding a predetermined quantity of material with a prescribed upper and lower tolerance of material from a source to a receiving means, which comprises preset input potentiometer means adapted to selectively establish one of a linear series of electrical input signals corresponding to the quantity of material to be delivered from the source, a quantity sensitive potentiometer means adapted to establish like electrical signals in proportion to material received in said receiving means, signal establishing means to compare the output signals of said potentiometers and to establish a control signal in proportion to the difference therebetween, feeding means adapted to be connected to a source of power to feed material to the receiving means incident to a predetermined control signal, adjustable potentiometer means operatively connected in circuit with said input potentiometer and said quantity sensitive potentiometer means and adapted to shift the respective electrical series relative to each other and thereby affect said control signal in a predetermined manner, automatic switching means operably coupled with said last named potentiometer means to selectively operably connect and operably disconnect said last named potentiometer from circuit to selectively shift said electrical series to compare the material delivered to the receiving means with a predetermined tolerance in the quantity of the material delivered, control means to actuate said switching means, electrically controlled switching means adapted to successively connect said feeding means and said control means to a source of power to successively feed material to the receiving means and establish said comparison, actuating means to initiate actuation of said electrically controlled means, and means responsive to said initial actuation to operatively couple said actuating means to said control signal.

10. An automatic control for feeding a predetermined quantity of material with a prescribed upper and lower tolerance of material from a source to a receiving means having material releasing means, which comprises preset input potentiometer means adapted to selectively establish one of a linear series of electrical input signals corresponding to the quantity of material to be delivered from the source, a quantity sensitive potentiometer means adapted to establish like electrical signals in proportion to material received in said receiving means, signal establishing means to compare the output signals of said potentiometers and to establish a control signal incident to a predetermined difference therebetween, electrically controlled feed means to control feeding of material to the receiving means, first electrically controlled lock means operatively coupled with the releasing means to control the same, first adjustable potentiometer means connected in circuit with said input potentiometer and second quantity sensitive potentiometer means and adapted to shift the respective electrical series relative to each other, second adjustable potentiometer means connected in circuit with said input potentiometer and said second quantity sensitive potentiometer means and adapted to shift the electrical series relative to each other in an opposite direction from said first adjustable potentiometer, automatic switching means operably coupled with said first adjustable potentiometer means to selectively operably connect and operably disconnect said last named potentiometer from circuit to selectively shift said electrical series to compare the material delivered to the receiving means with a predetermined tolerance in the quantity of the material delivered, first control means to actuate said automatic switching means, second automatic switching means operably coupled with said first adjustable potentiometer means to selectively operably connect and operably disconnect said last named potentiometer from circuit to selectively shift said electrical series to compare the material delivered to the receiving means with a predetermined tolerance in the quantity of the material delivered, second control means to actuate said second automatic switching means, electrically controlled switching means adapted to successively connect said feeding means and said control means to a source of power to successively feed material to the receiving means and establish said comparison, actuating means to initiate actuation of electrically controlled means, and means responsive to said initial actuation to operatively couple said actuating means to said control signal.

11. An automatic control for gravity feeding a predetermined quantity of material from a storage bin having a bottom gate in aligned vertically spaced relation to a receiving means having a bottom discharge gate, said delivered material having a predetermined upper and lower tolerance, which comprises an input potentiometer means adapted to be connected across a set of power lines to establish an input signal proportional to the weight of material to be transferred, weight sensitive potentiometer means operably coupled with said receiving means to establish a corresponding electrical feed signal, electromagnetic means to establish a feed from said bulk source to said receiving means, comparison means adapted to establish an output signal incident to a predetermined difference between said input signal and said feed signal, circuit means to control discharge of material from said receiving means, potentiometer means adapted to be selectively connected in circuit with said input potentiometer and said weight sensitive potentiometer to electrically shift said input signal and said feed signal relative to each other in accordance with one of said tolerances, second potentiometer means adapted to be selectively connected in circuit with said input potentiometer and said weight sensitive potentiometer to electrically shift said input signal and said feed signal in an opposite direction relative to each other in accordance with the other of said tolerances, step switching means adapted to successively complete said feed circuit and the tolerance comparing circuits and the discharge circuit means in response to said output signal, and means to prevent establishment of an operative output signal incident to an out of tolerance response in either of said tolerance checking circuit means.

12. An automatic control for delivering a predetermined quantity of material from a bulk source to a receiving means, which comprises signal generating means adapted to establish a signal proportional to the quantity difference between said predetermined quantity and the delivered quantity, first circuit means to control delivery of the material from the bulk source, second circuit means operatively coupled with said signaling means to automatically compare the variation of material received with respect to a predetermined tolerance, third circuit means to control discharge of the material in the receiving means, an electromagnetically operated stepping switch to successively complete said third circuit means, relay means connected to said signal generating means to control said stepping switch, means responsive to an out-of-tolerance comparison by said second circuit means to prevent actuation of the relay means to energize said stepping switch to complete said third circuit means, and means to reset said stepping switch incident to completion of said third circuit means.

13. An automatic cyclic control for feeding a predetermined quantity of material from a bulk source to a weighing hopper within a predetermined upper and lower tolerance, which comprises voltage generating means adapted to establish a series of electrical input signals proportional to the weight of material to be transferred, weight sensitive voltage generating means operably coupled with said receiving means and adapted to establish a corresponding series of electrical feed signals incident to material delivery to said weighing hopper, comparison means adapted to establish an output signal incident to a predetermined difference between said input signal and said feed signal, electrically actuated feed means to regulate delivery of material to said weighing hopper, circuit means connected to control discharge of material from said weighing hopper, tolerance voltage generating means operably coupled with said first and second named voltage generating means to first shift said input signals and said feed signals relative to each other in accordance with one of said tolerances and to subsequently shift said input signals and said feed signals in an opposite direction relative to each other in accordance with the other of said tolerances, sequence controlling means adapted to successively complete an operating circuit to said feed means and subsequently to the tolerance voltage generating means to sequentially check said tolerances and finally to complete said discharge circuit means, means connecting the sequence controlling means to said output signal, and means to prevent operation of the sequence controlling means incident to an output signal established by an out of tolerance response in either of said tolerances checking circuit connections.

14. An automatic cyclic controller for gravity feeding a predetermined quantity of granulated material from a storage bin having an electrically controlled main bottom discharge gate to a weighing hopper having an electrically controlled secondary bottom discharge gate, said predetermined quantity including a predetermined upper and lower tolerance, which comprises an input potentiometer adapted to be connected in circuit across a set of power lines and calibrated in accordance with weight of material to be delivered, said potentiometer having an adjustable tap to establish a voltage signal proportional to the weight of material to be delivered, a weight sensing potentiometer substantially identical to said first potentiometer and connected in a parallel circuit with said first potentiometer and having a tap operatively coupled to said weighing hopper positioned in accordance with the weight in the hopper, circuit means connected to compare the potential of said taps and incident to a greater potential on the first named tap establishing a control signal, electrically operated feed means to actuate the main discharge gate to deliver material to said weighing hopper, a pair of lower-tolerance-check potentiometers series connected one to each side of said weight sensing potentiometer and having a pair of ganged taps to maintain a total constant potential drop in said circuit and to insert a potential drop proportional to the lower tolerance to the low side of said weight sensing potentiometer, a compensating impedance series connected in the high side of said input potentiometer and being equal in impedance to each of said lower-tolerance-check potentiometers, normally closed relay contacts connected across the lower-tolerance-check potentiometer on the low side and normally open relay contacts in series with the tap of the opposite lower-tolerance-check potentiometer, a relay circuit to open and close said last named relay contacts, an electrically operated signalling means, a third set of relay contacts controlled by said relay circuit and connected in series with said signalling means to energize the same incident to completion of said relay circuit, a pair of upper-tolerance-check potentiometer series connected one to each side of said weight sensing potentiometer and having a pair of ganged taps to maintain a total constant potential drop in said circuit, a set of normally open relay contacts connected in series with the tap of said upper-tolerance-check potentiometer connected to the low side and a set of normally closed relay contacts connected in parallel with the opposite connected upper-tolerance-check potentiometer, a second relay circuit to close and open said last named normally closed and normally open contacts, a second electrically operated signalling means, a third set of relay contacts controlled by said second relay circuit and connected in series with said second electrically operated signalling means to energize the same incident to completion of said last named third set of relay contacts, a discharge relay circuit operatively connected to the weighing hopper discharge gate to condition the same for releasing said received material, sequence controlling means adapted to successively energize said feed means and said first and second discharge relay circuits, and means to operatively connect said sequence controlling means to said control signal to regulate said sequence in accordance with the condition of said control signal.

15. An automatic cyclic controller for gravity feeding a predetermined quantity of granulated material from a storage bin having an electrically controlled main bottom discharge gate to a weighing hopper having an electrically controlled secondary bottom discharge gate, said predetermined quantity including a predetermined upper and lower tolerance, which comprises an input potentiometer adapted to be connected in circuit across a set of power lines and calibrated in accordance with weights of material to be delivered, said potentiometer having an adjustable tap to establish a voltage signal proportional to the weight of material to be delivered, a weight sensing potentiometer substantially identical to said first potentiometer and connected in a parallel circuit with said first potentiometer and having a tap operatively coupled to said weighing hopper positioned in accordance with the weight in the hopper, circuit means to compare the potential of said taps to establish a control signal incident to a greater potential on the first named tap, means responsive to the presence of said control signal to actuate the main discharge gate to deliver material to said weighing hopper, a pair of lower-tolerance-check potentiometers series connected one to each side of said weight sensing potentiometer and having a pair of ganged taps to maintain a total constant potential drop in said circuit and to insert a potential drop proportional to the lower tolerance to the low side of said weight sensing potentiometer, a compensating resistance series connected in the high side of said input potentiometer and being equal in resistance to each of said lower-tolerance-check potentiometers, normally closed relay contacts connected across the lower-tolerance-check potentiometer on the low side and normally open relay contacts in series with the tap of the opposite lower-tolerance-check potentiometer, a relay circuit responsive to discontinuance of material delivery to open and close said last named relay contacts, an electrically operated signal means, a third set of relay contacts controlled by said relay circuit and connected in series with said signal means to energize the same incident to completion of said relay circuit, a pair of upper-tolerance-check potentiometers series connected one to each side of said weight sensing potentiometer and having a pair of ganged taps to maintain a total constant potential drop in said circuit, a set of normally open relay contacts connected in series with the tap of said upper-tolerance-check potentiometer connected to the low side and a set of normally closed relay contacts connected in parallel with the opposite connected upper-tolerance-check potentiometer, a second relay circuit responsive to predetermined control signal in response to establishment of said first relay circuit to close and open said last named normally closed and normally open contacts, a third set of relay contacts controlled by said second relay circuit to energize the same incident to completion of said second relay circuit, and a discharge relay circuit operatively coupled to said hopper discharge gate and responsive to a predetermined control signal in response to establishment of said second relay circuit to condition the secondary discharge gate for releasing said received material.

16. An automatic cyclic control for gravity feeding a predetermined quantity of granulated material from a storage bin having an electrically controlled main bottom discharge gate to a weighing hopper having an electrically controlled secondary bottom discharge gate, said predetermined quantity including a predetermined upper and lower tolerance, which comprises an input resistive potentiometer adapted to be connected across a set of power lines, said potentiometer having an adjustable tap to establish a linear series of voltage signals proportional to weights of material delivered, a weight sensing potentiometer substantially identical to said first potentiometer and connected in a parallel circuit with said first potentiometer and having a tap operatively coupled to said weighing hopper, said tap being positioned in accordance with the weight in the hopper to establish a like series of voltage signals, an amplifier having a pair of inputs connected respectively to said taps and having an output, said amplifier comparing the potential of said taps and conducting incident to a greater potential on the first named tap, a stepping relay device operatively coupled to said amplifier output and being latched in position when said amplifier conducts, said stepping relay device having a plurality of sequentially closed contacts, a start circuit for said stepping relay device to initiate actuation thereof, a latch circuit adapted to short circuit said start circuit incident to initial movement of said stepping relay device conditioning said stepping relay device for operation by the amplifier output, a first relay circuit series connected with first contacts of said stepping relay device and operatively connected to fully open the main gate, a pair of equal resistive premature cutoff potentiometers connected in series with said weight sensing potentiometer on electrically opposite sides of the same and having ganged taps to insert a constant potential drop in said circuit equal to the resistance of one of the cutoff potentiometers, a balancing resistance connected in series with the input potentiometer to the high side thereof and being equal to one of said premature cutoff potentiometers, said premature cutoff potentiometers increasing the potential of the weight sensing tap to cut off said amplifier prior to delivery of the predetermined weight and thereby actuate said stepping relay device to engage second contacts, a second relay circuit series connected with the second contacts and operatively connected to partially open the main gate, contacts of said relay circuit adapted to short circuit the cutoff potentiometer on the low side of the weight sensing potentiometer and to open the tap circuit of the opposite cutoff potentiometer incident to closing of said second contacts, latch means to maintain said last named contacts during the completion of a cycle, a pair of lower-tolerance-check potentiometers series connected one to each side of said weight sensing potentiometer and having a pair of ganged taps to maintain a total constant potential drop in said circuit and adapted to insert a potential drop proportional to the lower tolerance to the low side of said weight sensing potentiometer, a compensating resistance series connected in the high side of said input potentiometer and being equal in resistance to each of said lower-tolerance-check potentiometers, normally closed relay contacts connected across the lower-tolerance-check potentiometer on the low side and normally open relay contacts in series with the tap of the opposite lower-tolerance-check potentiometer, a third relay circuit series connected with third contact of said stepping relay device and adapted to open and close said last named relay contacts, a lamp, a third set of relay contacts controlled by said third relay circuit and connected in series with said lamp to illuminate the same incident to completion of said third relay circuit, a pair of upper-tolerance-check potentiometers series connected one to each side of side weight sensing potentiometer and having a pair of ganged taps to maintain a total constant drop in said circuit, a set of normally open relay contacts connected in series with the tap of said upper-tolerance-check potentiometer connected to the low side of said weighing sensing potentiometer and a set of normally closed relay contacts connected in parallel with the opposite connected upper-tolerance-check potentiometer, a fourth relay circuit series connected with fourth contacts of said stepping relay device and adapted to close and open said last named normally closed and normally open contacts, a second lamp, a third set of relay contacts controlled by said fourth relay circuit and connected in series with said second lamp to illuminate the same incident to completion of said last named third relay contacts, a discharge relay circuit connected to fifth contacts of said stepping relay device and operatively coupled to said hopper discharge gate to condition the same for releasing said received material, and means to reset said stepping relay device to standby subsequent to completion of said discharge relay circuit to complete a cycle of operation.

17. An automatic cyclic control for delivering a predetermined quantity of material from a bulk source to a weighing hopper within a predetermined upper and lower tolerance, which comprises means to establish a series of electrical input signals proportional to quantities of material to be successively delivered to said weighing hopper, quantity sensitive means operably coupled with said weighing hopper to establish corresponding electrical cutoff signals incident to the weight of material received by the weighing hopper, comparison means adapted to establish an output control signal incident to a predetermined difference between said input signal and said cutoff signal, discharge circuit means to control discharge of material from said weighing hopper, feed circuit means to control delivery of material to the weighing hopper, circuit means adapted to shift said input signals and said cutoff signals relative to each other in accordance with one of said tolerances, second circuit means adapted to shift said input signals and said cutoff signals in an opposite direction relative to each other in accordance with the other of said tolerances, a sequence controller adapted to successively complete said feed circuit means and the tolerance comparing circuits and the discharge circuit means, a first relay circuit adapted to control said sequence controller in response to said output signal, and a second relay circuit adapted to control said sequence controller in response to said output signal, and control means responsive to the condition of said tolerance-shift circuit means to selectively operatively connect said first and second relay circuit to said output signal.

References Cited in the file of this patent

UNITED STATES PATENTS

| | | |
|---|---|---|
| 2,076,617 | Cleaves | Apr. 13, 1937 |
| 2,468,843 | Sunstein | May 3, 1949 |
| 2,597,831 | Willis | May 20, 1952 |
| 2,581,205 | Reilly | Jan. 1, 1952 |
| 2,726,061 | Schieser | Dec. 6, 1955 |
| 2,728,285 | Bradley et al. | Dec. 27, 1955 |
| 2,868,491 | Thorsson et al. | Jan. 13, 1959 |

FOREIGN PATENTS

| | | |
|---|---|---|
| 1,163,040 | France | Apr. 21, 1956 |